Sept. 4, 1923.
J. L. DINSMOOR
SEAL
Filed June 10, 1921
1,466,815
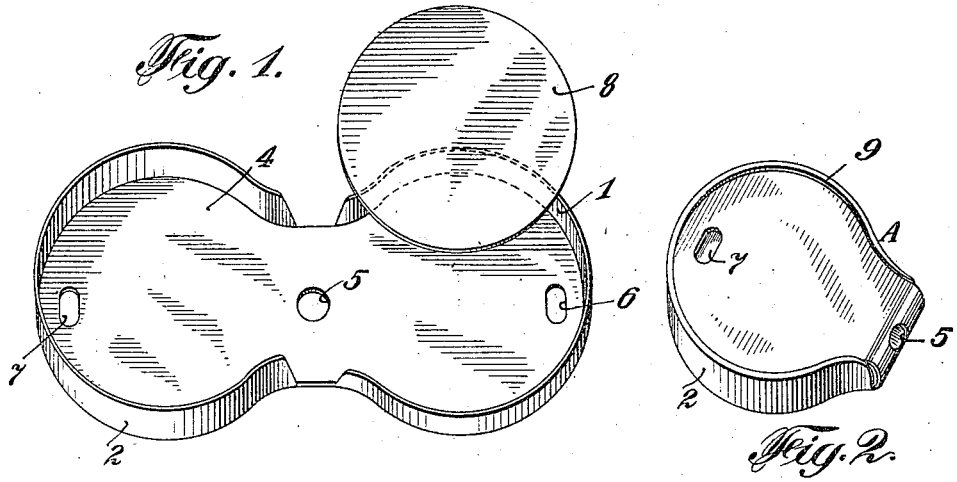
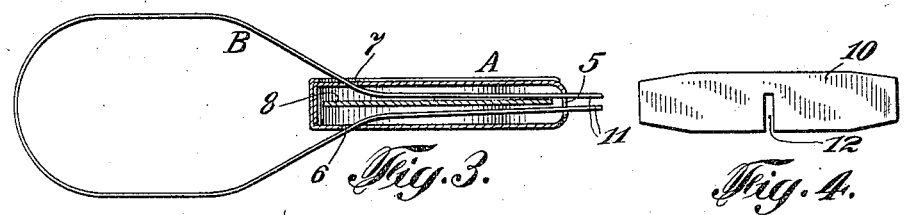
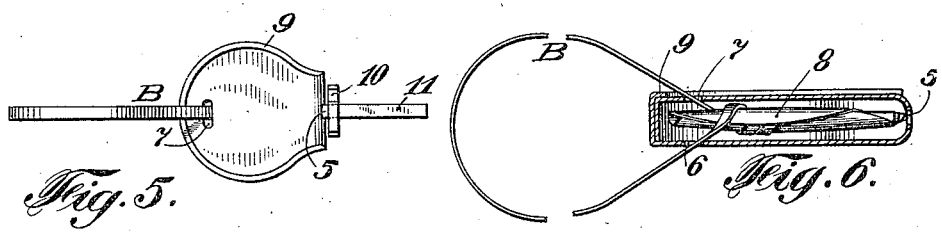
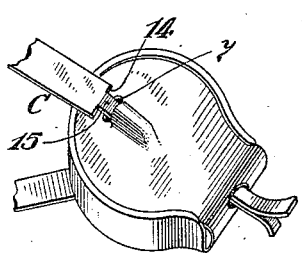
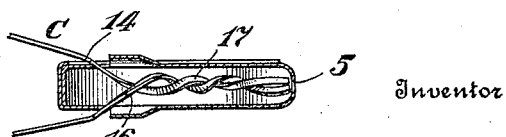
Inventor
John L. Dinsmoor
By George Ramsey
his Attorney Patented Sept. 4, 1923.

1,466,815

UNITED STATES PATENT OFFICE.

JOHN L. DINSMOOR, OF BROOKLYN, NEW YORK, ASSIGNOR TO ANCHOR CAP AND CLOSURE CORPORATION, OF LONG ISLAND CITY, NEW YORK, A CORPORATION OF NEW YORK.

SEAL.

Application filed June 10, 1921. Serial No. 476,389.

*To all whom it may concern:*

Be it known that I, JOHN L. DINSMOOR, a citizen of the United States, and a resident of the borough of Brooklyn, in the county of Kings, State of New York, have invented new and useful Improvements in Seals, of which the following is a specification.

The present invention relates to seals and more specially to a seal of the shackle type.

The principal object of the present invention is to provide a seal of a simple construction and adapted to be used with a separate shackle whereby the length of the shackle is independent of the seal.

A further object of the present invention is a seal formed substantially of a housing of pressed metal wherein no springs are utilized in the sealing operation, which is performed by mechanically deforming the internal construction of the seal.

A still further object of the present invention is a seal of the character specified and wherein the sealing operation comprises deforming of a ductile member within the seal housing which deformation locks the shackle within the housing.

Another and important object of the present invention is a seal of the character specified comprising an integral housing within which shackle members are adapted to be twisted upon themselves and locked within the housing in such manner that the twisted portion is not accessible from the exterior of the housing.

More specifically an object of the present invention is the production of a seal comprising a closed sheet metal housing, with a shackle adapted to be inserted within the housing and a ductile plate within the housing which wraps around the ends of the shackle when the said ends are twisted.

A still further and more specific object of the present invention is a seal of the character specified and wherein the ends of the shackle extend beyond the seal housing and adapted to be operated upon by a sealing tool whereby the ends are twisted upon themselves which causes the shackle to engage a ductile plate within the housing so that the plate is wrapped around the end of the shackle and, the twisted operation is continued until the ends of the shackle extending beyond the housing are broken away.

Another object of the present invention is a seal of the character specified comprising a sheet metal housing with the walls thereof spaced apart and a ductile metal disk loosely mounted in the housing which has shackle openings on each side of the housing and an outlet opening in the end of the housing, whereby when shackle ends are inserted through the inlet openings these ends will extend on each side of the disk and will come out of the inlet opening substantially parallel so that by twisting the ends adjacent the outlet opening until the ends are broken away the portion of the shackle in the housing is twisted around the disk and securely locked therein to prevent the ends being removed.

Other and further objects of the present invention will in part be obvious and will in part be pointed out hereinafter by reference to the accompanying drawings in which like parts are represented by like characters throughout the several figures thereof.

Realizing that the present invention may be embodied in constructions other than those specifically herein disclosed it is desired that the disclosure shall be understood as illustrative and not in the limiting sense.

Figure 1 is a view showing a blank adapted to be folded upon itself to form the housing and also illustrating a ductile member adapted to be enclosed in the housing.

Figure 2 is a perspective view of the complete device.

Figure 3 is a sectional view illustrating a shackle inserted on each side of the disk.

Figure 4 illustrates the sealing tool.

Figure 5 shows the sealing tool in position on the ends of the shackle.

Figure 6 is a sectional view showing how the ductile disk rolls upon itself when the seal is completed.

Figure 7 illustrates the manner in which the seal may be used with a supply of shackle material and without cutting the material before the seal is made.

Figure 8 illustrates a modified form of seal in which no disk is used.

Figure 9 is a sectional view showing the portion of the device illustrated in Figure 8.

Heretofore in the art of shackle seals the most customary seals have been those wherein the shackle was of a definite length with recesses or tongues cut in the end of the shackle in order that these portions might engage suitable locking springs on the exterior of the seal housing. These types of spring lock seals are expensive to manufacture and assemble and the spring parts are liable to become dislocated during handling or shipping of the seals. Furthermore the length of the shackle is necessarily predetermined and therefore must be proportioned to be the right length for a particular use. Where the seal is intended for other uses different length shackles must be provided. This is annoying and the various lengths of shackles are not usually at hand when desired. Furthermore devices of this kind afford an opportunity for pulling the parts from the housing in order to break the seal then reinserting the end of the shackle into the housing so that the seal appears to be unbroken from the exterior.

One of the oldest types of seals is the lead seal wherein a wafer or button of pliable material is slipped over the shackle which must be crinkled or roughened and then the wafer is deformed by considerable pressure to smash the button around the shackle. This type of seal requires very heavy sealing tools and considerable strength to operate the tools. Furthermore a relatively large amount of metal is required for the button and hence the seals in large numbers are expensive. Since seals are adapted for use but once and then are destroyed, cost, is a primary element in commercial use.

The present invention overcomes the difficulties of the known art by providing seals adaptable for manufacture from sheet metal and wherein the sealing shackle is separate and independent from the seals and may comprise a plain flat piece of metal of any length desired. Furthermore the seal may be slipped over the shackle without severing the shackle from the supply so that exactly the right amount of shackle may be used without waste for sealing without regard to number or size of packages.

The invention may be embodied in several forms but preferably comprises a housing having entrance openings to guide the shackle into the housing from each side thereof and to direct the ends of the shackle toward a common outlet opening so that the ends lie side by side. These ends are adapted to be grasped by a suitable tool which twists the ends upon themselves until the ends are broken away. The twisting action extends back into the housing but the breaking always occurs adjacent the tool which is at the outlet opening. This produces a result wherein the ends of the shackle are twisted within the housing itself so that these ends are inaccessible. Means are provided so that the housing may not be slipped back upon the shackle to permit the untwisting of the ends by unauthorized persons. In one form this stop means may comprise a ductile member mounted within the housing in such manner as to lie between the ends of the shackle when these ends are inserted in the housing so that the twisting operation causes the member to wrap around the twisted parts. Another way of accomplishing this same result is to provide a shackle which is relatively wide and which is narrow at the ends to provide shoulders which are of a width too great to enter into the housing. These shoulders are shoved against the side wall of the housing and then the narrow ends of the shackle are twisted in the manner specified until the protuding portions are broken away. This securely locks the parts together. In this form the shackle must be of a predetermined length.

Referring now to the drawings which illustrate the preferred form of the present invention the housing may comprise a unitary structure of tin substantially of an hour-glass shaped body flange 1 on one end and a flange 2 on the other end with a backing 4 from which the flanges are turned. The back 4 is provided with an outlet opening 5 and with a pair of outlet openings 6 and 7. A ductile disk 8 is adapted to be dropped into one of the flange sections then the metal is folded on itself so that the portion adjacent the opening 5 becomes an end wall and the flanges 1 and 2 are telescoped. The edge of the flange 2 is rolled over the flange 1 as at 9 and securely seated in position to form the complete seal housing A. This last operation is performed in a large machine so that it would be substantially impossible, or at least very difficult to pry open the seal and then reset the same without leaving obvious traces on the flange 9. The shackle B which may comprise a flat wire is adapted to have the ends inserted through the inlet openings 6 and 7 respectively at which time these ends will pass on each side of the ductile disk 8 and the ends will pass out of the outlet opening 5 with the sides of the wire parallel. The sealing tool 10 is provided with a seal or notch 12 adapted to fit over the ends 11 of the shackle B. This tool is moved close up to the opening 5 and is turned around on the axis of the shackle ends in such manner as to twist the shackle within the housing. The twisting action wraps the disk 8 around the sealing wires which are twisted upon themselves. This produces a relatively complex bunch of material within the housing and thus securely locks the shackle in place so that the ends can neither be withdrawn or pushed out of the housing. The outlet opening 5 is relatively small as compared to the twisted up mass so that it is substantially impossible to reach the mass through the opening with any instrument that would permit untwisting of the parts.

Figures 8 and 9 illustrate a modified form of the invention wherein the ductile member is omitted and the shackle C is a relatively wide sheet of metal and is provided at the ends with shoulder portions 14 which are adjacent a reduced end 15. The ends of the shackle extend through the housing and lie parallel as at 16 so as to be capable of being twisted by the sealing tool to form the twisted mass 17, Figure 9. This twisted mass prevents the shackle from being withdrawn from the housing and the shoulders 15 prevent the shackle from being pushed through the housing so that the parts are securely locked together. The device described in the foregoing is a seal of exceeding simplicity and great security which may be manufactured at a relatively small cost.

Having thus described my invention, what I claim is:

1. A seal comprising a hollow housing, said housing having an inlet opening and an outlet opening, a shackle, and means within said housing to guide the ends of the shackle from said inlet opening to said outlet opening, said means being so constructed as to entangle the ends of the shackle when the said shackle is twisted within the said housing.

2. A seal comprising a flat hollow housing, said housing having inlet openings on the sides and an outlet opening on an edge, a shackle, and means within said housing to guide the ends of the shackle from said inlet opening to said outlet opening, said means being so constructed as to entangle the ends of the shackle when the said shackle is twisted within the said housing.

3. A seal comprising a hollow housing, said housing having an inlet opening and an outlet opening, a shackle, and means comprising a flat sheet member within said housing to guide the ends of the shackle from said inlet opening to said outlet opening, said means being so constructed as to entangle the ends of the shackle when the said shackle is twisted within the said housing.

4. A seal comprising a hollow housing made from a single piece, said housing having an inlet opening and an outlet opening, a shackle, and means within said housing to guide the ends of the shackle from said inlet opening to said outlet opening, said means being so constructed as to entangle the ends of the shackle when the said shackle is twisted within the said housing to prevent movement of the shackle relatively to the housing when the seal is made.

5. A seal comprising a flat hollow housing, said housing having inlet openings on the sides and an outlet opening on an edge, a shackle, and means comprising a flat sheet member within said housing to guide the ends of the shackle from said inlet opening to said outlet opening, said means being so constructed as to entangle the ends of the shackle when the said shackle is twisted within the said housing.

6. A seal comprising a flat hollow housing made from a single piece, said housing having inlet openings on the sides and an outlet opening on an edge, a shackle, and means within said housing to guide the ends of the shackle from said inlet opening to said outlet opening, said means being so constructed as to entangle the ends of the shackle when the said shackle is twisted within the said housing to prevent movement of the shackle relatively to the housing when the seal is made.

7. In a seal, the combination of a hollow housing having substantially flat sides, said flat sides being provided with inlet openings, an outlet opening provided in one side wall of said housing, a shackle, and means to prevent movement of said shackle relatively to said housing when the ends of the shackle are twisted within said housing.

8. In a seal, the combination of a hollow housing having substantially flat sides, said flat sides being provided with inlet openings adjacent one edge, an outlet opening provided in one side wall of said housing, and opposite to the inlet openings, a shackle, and means to prevent movement of said shackle relatively to said housing when the ends of the shackle are twisted within said housing.

9. In a seal, the combination of a hollow housing having substantially flat sides, said flat sides being provided with inlet openings, an outlet opening provided in one side wall of said housing, a shackle, and means adapted to be deformed to prevent movement of said shackle relatively to said housing when the ends of the shackle are twisted within said housing.

10. In a seal, the combination of a hollow housing having substantially flat sides, said flat sides being provided with inlet openings adjacent one edge, an outlet opening provided in one side wall of said housing, and opposite to the inlet openings, a shackle, and means adapted to be deformed to prevent movement of said shackle relatively to said housing when the ends of the shackle are twisted within said housing.

11. A seal comprising a hollow housing formed of a single piece of sheet metal, a ductile member within said housing, a shackle, means to guide said shackle on each side of said ductile member, whereby said ductile member is entangled with said shackle when said shackle is twisted within said housing.

12. As an article of manufacture, a seal comprising a hollow housing formed of a single piece of sheet metal, a ductile member within said housing, means to guide a shackle on each side of said ductile member, whereby said ductile member is adapted to be entangled with said shackle when said shackle is twisted within said housing.

13. A seal comprising a hollow housing formed of a single piece of sheet metal, a ductile member loosely mounted within said housing, a shackle, means to guide said shackle on each side of said ductile member, whereby said ductile member is entangled with said shackle when said shackle is twisted within said housing.

14. As an article of manufacture, a seal comprising a hollow housing formed of a single piece of sheet metal, a ductile member loosely mounted within said housing, means to guide a shackle on each side of said ductile member, whereby said ductile member is adapted to be entangled with said shackle when said shackle is twisted within said housing.

JOHN L. DINSMOOR.